(12) United States Patent
Malm et al.

(10) Patent No.: US 8,845,765 B2
(45) Date of Patent: Sep. 30, 2014

(54) METHOD FOR LIPID EXTRACTION FROM BIOMASS

(75) Inventors: Annika Malm, Helsinki (FI); Reijo Tanner, Hikiä (FI); Mervi Hujanen, Helsinki (FI)

(73) Assignee: Neste Oil Oyj, Espoo (FI)

( * ) Notice: Subject to any disclaimer, the term of this patent is extended or adjusted under 35 U.S.C. 154(b) by 401 days.

(21) Appl. No.: 13/291,306

(22) Filed: Nov. 8, 2011

(65) Prior Publication Data

US 2012/0110898 A1    May 10, 2012

Related U.S. Application Data

(60) Provisional application No. 61/411,145, filed on Nov. 8, 2010.

(30) Foreign Application Priority Data

Nov. 8, 2010  (EP) .................................. 10190309

(51) Int. Cl.
| | | |
|---|---|---|
| C10L 1/00 | (2006.01) | |
| C11B 1/10 | (2006.01) | |
| C10L 1/02 | (2006.01) | |
| C10L 1/18 | (2006.01) | |

(52) U.S. Cl.
CPC . *C11B 1/10* (2013.01); *C10L 1/026* (2013.01); *C10L 1/18* (2013.01); *C10L 1/1802* (2013.01); *Y02E 50/13* (2013.01)
USPC ................ 44/307; 44/308; 435/132; 435/134

(58) Field of Classification Search
CPC ......... C10L 1/18; C10L 1/1802; C10L 1/026; Y02E 50/13; C10G 2300/1011; C12P 7/64; C12P 7/6409; C12P 7/6445; C12P 7/6463; C12P 7/649
USPC .............................. 44/307, 308; 435/132, 134
See application file for complete search history.

(56) References Cited

U.S. PATENT DOCUMENTS

| 4,341,038 A | 7/1982 | Bloch et al. |
|---|---|---|
| 4,857,329 A | 8/1989 | Sako et al. |
| 6,166,231 A * | 12/2000 | Hoeksema .................... 554/12 |
| 2007/0218175 A1 | 9/2007 | Chou et al. |
| 2008/0188676 A1 | 8/2008 | Anderson et al. |
| 2010/0330615 A1 | 12/2010 | Neto |
| 2011/0272353 A1 | 11/2011 | Herold et al. |

FOREIGN PATENT DOCUMENTS

| AU | 2007203074 A1 | 7/2007 |
|---|---|---|
| WO | WO 2008/034109 A1 | 3/2008 |
| WO | WO 2008/134836 A2 | 11/2008 |
| WO | WO 2010/089063 A1 | 8/2010 |
| WO | WO 2011/049572 A1 | 4/2011 |

OTHER PUBLICATIONS

Mulbry et al., "Optimization of an Oil Extraction Process for Algae from the Treatment of Manure Effluent" Journal of the American Oil Chemists' Society, (Sep. 1, 2009), vol. 86, Issue 9, pp. 909-915.
Notification of Transmittal of the International Search Report (Form PCT/ISA/220 and PCT/ISA 210) and the Written Opinion of the International Searching Authority (Form PCT/ISA/237) dated Feb. 28, 2012, issued in the corresponding International Application No. PCT/FI2011/050984. (12 pages).
Extended European Search Report issued on Apr. 14, 2011, in European Application No. 10190309.4.

* cited by examiner

*Primary Examiner* — Cephia D Toomer
(74) *Attorney, Agent, or Firm* — Buchanan Ingersoll & Rooney

(57) ABSTRACT

A method for recovering lipids from microbial biomass, the method including providing wet microbial biomass which contains lipids to extraction without disrupting the biomass cell walls, and subsequently, extracting the wet microbial biomass with a liquid extractant at elevated temperature of at least 170° C. and elevated pressure. The combination of the temperature and pressure is such that the lipids in the cells are contacted with the extractant. Subsequently the extracted lipids are recovered from or with the extractant.

22 Claims, 7 Drawing Sheets

METHOD FOR LIPID EXTRACTION FROM BIOMASS

CROSS-REFERENCE TO RELATED APPLICATIONS

This application claims priority to European Patent Application No. 10190309.4, filed Nov. 8, 2010, and U.S. Provisional Patent Application No. 61/411,145, filed Nov. 8, 2010, wherein the contents of each of the above applications are incorporated herein by reference.

FIELD

Disclosed is a method for extracting lipids from microbial biomass. More specifically, the method relates to enhancing extraction yield and/or purity of lipids originating from wet microbial biomass.

BACKGROUND

Microorganisms such as algae, archaea, bacteria and fungi including filamentous fungi, mold and yeast may contain triglycerides up to 80% of their total dry matter content. However, oil from microbial biomass which is suitable as precursor for fuel production is scarce on the market. This is mainly due to lack of efficient and economical methods for providing good quality oil from microbial biomass.

The available methods for extracting oil or lipids from microbial biomass typically require the biomass to be dried and/or microbial cells to be disrupted. Drying of the biomass consumes much energy and is, for example, performed after centrifugation by contact drying, spray drying or even by freeze drying. The typical water content or the dry matter content of the biomass is dependent on the microbial material used. Typically dry matter contents from 15 up to 40% by weight can be achieved by traditional cell harvesting techniques such as centrifugation or filtration. Essentially, it is traditionally aimed at as low free water content as possible in order to maximize the extraction yields.

One alternative method for acquiring oil from biomass is to apply non-selective extractants which typically produces oil containing high amounts of impurities. Impurities such as metals, phosphorus and amino acids cause problems e.g. in the fuel production in form of catalyst poisons and/or corrosive materials. Therefore, it is often required to use post processing for removal of these undesired components from the extracted oil product.

Especially, the high amount of phospholipids in microbial biomass, i.e. the amount of membrane lipids from the total lipid content, is problematic. These phospholipids are typically in the form of metal salts providing high metal content into oil. Traditionally, these phospholipids have been removed from the crude bio oil fraction before further processing such as refining with catalytical processes.

In general, methods available suffer either from lack of selectivity to produce good quality oil or poor yield which are compensated by additional processing steps or selection of uneconomical processing conditions.

US2007218175 discloses a method for extracting an oil bearing plant with fatty acids alkyl esters at temperatures from 15° C. to 180° C. The inventors report that generally better yields are obtained with higher temperatures, but on the other hand, higher temperatures result in oil products with higher amounts of phosphorous. The use of higher extraction temperatures is thus not considered advantageous and extraction of wet microbial biomass is not disclosed.

U.S. Pat. No. 4,857,329 discloses an extraction method where fungi is extracted using a solvent in a supercritical state or a mixture of a solvent in supercritical state and a cosolvent selected from butane, pentane, hexane, heptane and cyclohexane. The pressures applied in order to provide the supercritical state are in the range of 200-600 kg/cm². The fungi cells are dehydrated to a moisture content of 50-70%, heated to temperatures of 150-200° C. and extracted with at least the solvent in supercritical state at temperatures below 90° C. There is no analysis given on impurities contained in the obtained oil product.

WO2008034109 discloses a method for recovering fatty acids in form of alkyl esters from microbial biomass, such as microalgae, bacteria and fungi. The biomass in treated at high temperatures up to 450° C. and elevated pressure, such as up to 40 MPa (about 400 bar). This high temperature treatment aims at and results in disruption of the cells and formation of an oily phase. An alcohol, such as methanol or ethanol, is added to the oily phase and alkyl esters (FAME or FAEE) are formed. Co-solvents, such as alkanes, and catalyst, such as organic acids, can be used. Esterification reactions require essentially water free environment and a high amount of alcohol present.

SUMMARY

Provided is a method for efficient removal of lipids, especially triglycerides, from wet biomass.

Provided is a method for efficient production of lipids from wet biomass which lipid product has a very low content of impurities such as phosphorus and/or detrimental metals.

Provided is a method for producing lipids suitable for use in catalytic refining processes for the production of various hydrocarbon components, biofuel and renewable diesel.

The inventors have found that lipid oil is obtained with good yield when wet microbial biomass is extracted under elevated temperature and pressure. Furthermore, the quality of the recovered oil is far better compared to extraction at conventional extraction temperatures and conditions. The recovered oil was found to have a low metal and phosphorus content. Using conventional extraction, like hexane extraction and hexane evaporation at 100° C. as typical maximum temperature, the metal content of the extracted oil is clearly higher.

The present invention provides a method for enhancing the purity and/or yield of oil originating from wet microbial biomass.

For example, phospholipids typically tend to accumulate into the oil phase together with the neutral lipids when extracting microbial biomass. The obtained extracted product of the present invention mainly contains fats and oils in triglyceride form.

A major advantage of the present invention is that no energy consuming drying is needed before performing the extraction of the wet biomass. Neither is it necessary to mechanically disrupt the microbial cells in order to enhance the oil yield.

Furthermore, the impurity content and especially phosphorus content of the oil is dramatically decreased which enhances the life cycle of catalysts in subsequent oil refining processes and reduces the need for additional pretreatments. Moreover, the total oil yield can be increased.

In the method of the present invention a need for pre or post processing for removal of phospholipids before the refining steps is thus avoided.

DETAILED DESCRIPTION

Figure 1:
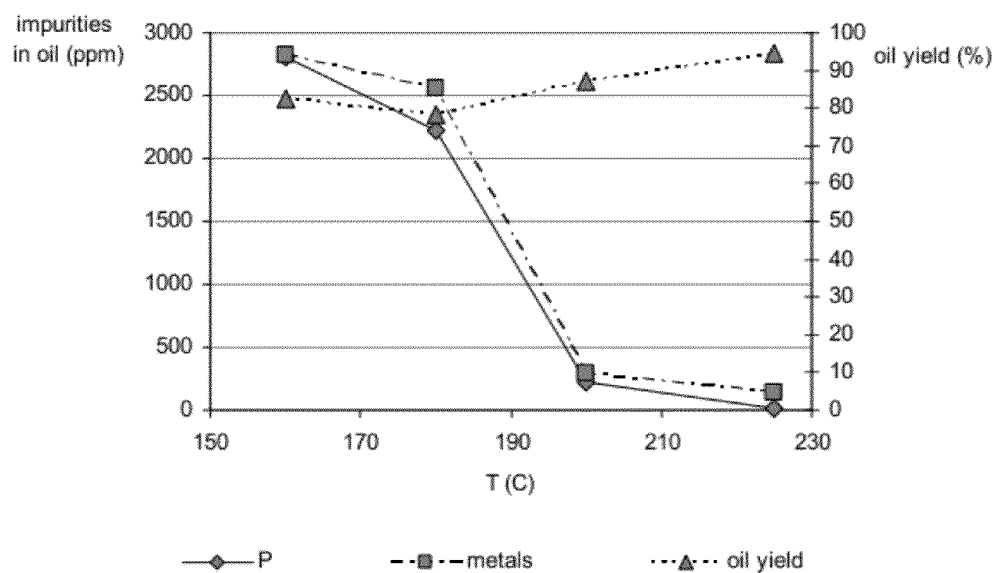
FIG. 1 shows the oil yield as percent of the total lipid amount and the impurity levels as a function of extraction temperature for *Nannochloropsis* microalgae extracted with heptane according to example 1.

The term "lipid" refers to a fatty substance, whose molecule generally contains, as a part, an aliphatic hydrocarbon chain, which dissolves in nonpolar organic solvents but is poorly soluble in water. Lipids are an essential group of large molecules in living cells. Lipids comprise, for example, fats, oils, waxes, wax esters, sterols, terpenoids, isoprenoids, carotenoids, polyhydroxyalkanoates, fatty acids, fatty alcohols, fatty acid esters, phospholipids, glycolipids, sphingolipids and acylglycerols, such as monoglycerides (monoacylglycerol), diglycerides (diacylglycerol) or triglycerides (triacylglycerol, TAG).

In the present invention desired lipids to be recovered in the product include fats, oils, waxes and fatty acids and their derivatives.

By the term "microbial biomass" is meant biomass derived from or containing microorganisms including bacteria, cyanobacteria, fungi such as yeasts, filamentous fungi and moulds, archaea, protists; microscopic plants such as algae or microalgae, plankton and the planarian. Most microorganisms are unicellular i.e. single-celled, however, some multicellular organisms are also microscopic. The microorganisms readily accumulate lipids or have been genetically modified to accumulate lipids or to improve accumulation of lipids.

In a preferred embodiment of the present invention lipid containing microbial biomass is selected from the group of bacteria, cyanobacteria, fungi such as yeasts, filamentous fungi and moulds, archaea, protists; microscopic plants such as algae, microalgae, plankton and planarian, more preferably microalgae, bacteria, fungi, filamentous fungi, moulds and yeasts.

In a preferred embodiment the microbial biomass comprises microalgae genera comprising *Dunaliella, Chlorella, Botryococcus, Brachiomonas, Chlorococcum, Crypthecodinium, Euglena, Haematococcus, Chlamydomas, Isochrysis, Pleurochrysis, Pavlova, Prototheca, Phaeodactylum, Pseudochlorella, Parachlorella, Bracteococcus, Scenedesmus, Skeletonema, Chaetoceros, Nitzschia, Nannochloropsis, Navicula, Nannochloris, Scihizochytrium, Sceletonema, Thraustochytrium, Ulkenia, Tetraselmis* and *Synechocystis*. The method was found to be particularly effective with microalgae selected from the group consisting of *Nannochloropsis* sp., *Dunaliella* sp. such as *Dunaliella tertiolecta*; *Phaeodactylum* sp. such as *Phaeodactylum tricornutum*; and *Chlorella* sp. such as *Chlorella pyrenoidosa* capable of incorporating a high lipid content.

In another preferred embodiment the microbial biomass comprises fungal species, especially filamentous fungal species, belonging to the following genera *Aspergillus, Mortierella, Chaetomium, Claviceps, Cladosporidium, Cunninghamella, Emericella, Fusarium, Glomus, Mucor, Paecilomyces, Penicillium, Pythium, Rhizopus, Trichoderma, Zygorhynchus, Humicola, Cladosporium, Malbranchea, Ustilago* especially those species having high amounts of lipids and essential fatty acids. Preferably, microbial biomass comprises *Mortierella isabellina, Mucor, Aspergillus* or *Rhizopus*.

In yet another preferred embodiment the microbial biomass comprises oleaginous yeast belonging to the following genera *Clavispora, Deparyomyces, Pachysolen, Kluyveromyces, Galactomyces, Hansenula, Saccharomyces, Waltomyces, Endomycopsis, Cryptococcus,* such as *Cryptococcus curvatus, Rhodosporidium,* such as *Rohodosporidium toruloides, Rhodotorula,* such as *Rhodotorula glutinis, Yarrowia,* such as *Yarrowia lipolytica, Pichia,* such as *Pichia stipitis, Candida* such as *Candida curvata, Lipomyces* such as *Lipomyces starkeyi* and *Trichosporon* such as *Trichosporon cutaneum* or *Trichosporon pullulans* which readily accumulate lipids or have been genetically modified to produce lipids. Most preferably, yeasts comprise *Lipomyces, Rhodosporidium,* or *Cryptococcus*.

In yet another preferred embodiment the microbial biomass comprises bacteria belonging to the following genera *Acinetobacter, Actinobacter, Alcanivorax, Aerogenes, Anabaena, Arthrobacter, Bacillus, Clostridium, Dietzia, Gordonia, Escherichia, Flexibacterium, Micrococcus, Mycobacterium, Nocardia, Nostoc, Oscillatoria, Pseudomonas, Rhodococcus, Rhodomicrobium, Rhodopseudomonas, Shewanella, Shigella, Streptomyces* and *Vibrio*. Most preferably bacteria comprise *Rhodococcus opacus, Acinetobacter, Nocardia* or *Streptomyces*.

In the present invention a method for recovery of lipids from microbial biomass is provided. The method comprises at least the following steps:
(i) Providing wet microbial biomass which contains lipids, without disrupting the biomass cell walls, to extraction. There is no external mechanical disruption step needed before subjecting the biomass to extraction for aiding the penetration of the extractant into contact with the lipids.
(ii) Extracting said wet microbial biomass with a liquid extractant at elevated temperature of at least 170° C. and elevated pressure, preferably more than 2 bar, but typically determined by the chosen temperature in the closed extraction system, wherein the combination of the temperature and pressure is such that said lipids in said cells are contacted with said extractant.
(iii) Subsequently, extracted lipids are recovered from or with said extractant.

The biomass to be processed may be obtained directly from cultivation or growth system such as a reactor. Suitable biomass comprises frozen biomass, as well. Biomass to be processed is treated by generally known methods, such as centrifugation, filtration, decanting, flotation or sedimentation possible assisted by flocculation, to remove excess water or aqueous growth solution. Microalgae, bacteria, archaea, filamentous fungi, mould or yeast biomass is preferably filtered or centrifuged before processing. On the other hand, biomass from solid state cultivation, immobilized cultivation or the like may be used by slurring it into aqueous media, if necessary.

By the term "wet" is meant microbial biomass which originates from aqueous cultivation solution and from which excess water is removed by common low energy consuming water removal processes such as filtering or the like and which is not specifically dried. Alternatively, solid dry microbial biomass may be slurried into an aqueous form.

In a preferred embodiment the water content of the wet microbial biomass is suitably high for enabling mass transfer by regular pumping means.

Dried or "dry" microbial biomass typically has a water content of about 10%, or less, wherein the water is bound water i.e. water inside the cell structure. The typical requirement for preservation is a water content of less than about 13%. When the biomass is not specifically dried there is in addition to bound water free water which is not bound in the microbial structure. This free water content depends on the microbial biomass type and the water removal method used. In the present invention wet microbial biomass has free water and the water content is preferably at least 60% by weight, more preferably at least 65%, most preferably at least 70%, such as at least 75% or in case of algae more than 80%. Especially when algae biomass is centrifuged the water content is about from 65 to 80%.

The method of the present invention is suitable for treating dried biomass, as well. Dry matter content of tested dried biomasses has preferably been from 95-98% by weight. However, as harvested biomass is generally wet i.e. harvested from aqueous cultures one major advantage is lost if the biomass is first subjected to unnecessary energy consuming drying before extraction.

Furthermore, water is beneficial for forming the second phase in addition to the extracting solvent for accommodating the undesired residues such as metals, phosphorus compounds, sugars and the like. To some extent these may adhere to the biomass residue surface but mainly they will reside in the aqueous phase.

After removal of excess water from the biomass to be treated in the method of the present invention the dry matter content of the biomass is below 70% by weight, preferably less than 45%, more preferably less than 40%. Depending on the aqueous microbial biomass to be treated the dry matter content may be as low as 4% by weight. However, preferably the dry matter content is at least 5% by weight, more preferably at least 10%, most preferably at least 11%, such as from 19 to 38%.

According to the present invention the wet microbial biomass is provided to an extraction unit which is optionally purged with inert gas, preferably nitrogen, to avoid or minimize possible reactions with ambient gas, and optionally set to an over-pressure of 1-5 bar measured from the closed reactor before starting the heating and extraction process. Subsequently, the biomass is subjected to an elevated temperature and pressure.

The extraction temperature is elevated to a temperature from at least 170° C. to preferably 300° C. or less wherein pyrolysis typically occurs at higher temperatures, preferably from 175° C. to 270° C., more preferably from 185° C. to 260° C., most preferably from 190° C. to 250° C., such as from 200° to 245° C. The preferred temperature range depends to some extent on the type of microbial biomass used. The selection of optimal temperature depends not only from the maximum yield or purity possible to obtain but also on the further use of the oil and residue aimed at. For example, if the further use is in catalytic biofuel refining process it sets criteria for the catalyst poison i.e. metal and phosphorus content. It is not necessary to optimise the process further after reaching low enough values. Moreover, the quality of the recovered lipid, such as TAG content for example, varies depending on the processing parameters used. The quality of the residue depends on the used extraction temperature. The residue may be directed to combustion for creating energy when higher temperatures are used. Feed or fodder utilization of the residue is enabled by the application of lower extraction temperatures.

The extraction pressure is elevated due to increased temperature as typically closed pressure vessels or reactors are used. The extraction pressure depends on the selected temperature, selected solvent i.e. the boiling point and vapour pressure thereof and the reactor dead volume. A skilled person is able to determine the pressure value based on theoretical calculation using these parameters. In a batch operation mode typically about 65% is effective volume whereas about 35% is dead volume. Preferably, the solvents are chosen with the provision of at least 95%, preferably 98%, more preferably 99%, thereof being in liquid phase. A preferred pressure range is from 5 bar to 100 bar, more preferably from 10 to 80 bar, most preferably from 20 to 70 bar, such as from 25 to 60 bar. Target temperature sets limit for the maximum water, and optionally alcohol, content during the oil extraction. These components typically have high vapour pressures and therefore in suitable cases, preferably, part of water or alcohol is removed by distillation during the heating stage. This enables reaching the targeted temperature with the chosen extractant. Or alternatively, the amount of alcohol needs to be limited or low compared to primary extractant such as hexane or heptanes.

The aim in increasing the extraction temperature and pressure is to enable better contact of the extractant with the lipids. Without being bound by any particular theory it is anticipated that the weak interactions in the material are diminished due to the high temperature allowing the solvent to interact with the lipid components. The water content of the microbial biomass cells may be responsible for the lipids of the cell structure to become available for contacting with the extractant while subjected to high temperature and pressure thus releasing the lipids therein. The extraction was found to be facilitated depicted by enhanced extracted lipid yield and enhanced purity of the extracted lipids.

Suitable extractants for use in the present invention are non-polar organic solvents which are essentially, or preferably totally, immiscible with water. The miscibility with water phase results in yield loss and possible difficulties in phase separation. It is possible to use any kind of lipid dissolving solvent, but preferred solvents are long chained aliphatic or cyclic alkanes $C_3$-$C_{16}$, more preferably $C_5$-$C_{12}$ alkanes. Most preferred alkanes comprise hexane, heptane or octane or mixtures thereof.

According to one embodiment mixture of alkanes suitable for oil refining such as different gasoline distillation fractions may be used. Preferably, these fractions contain heptane and/or octane. An example for suitable solvent is refinery petroleum distillation fractions like low aromatic or aromatic free hydrocarbon solvent mixtures such as NESSOL LIAV 110 (bp. 85-110° C., available from Neste Oil), LIAV 230 (bp. 175-225° C.) and the like.

The extraction is performed using liquid extractants. This means that the pressure of the extraction vessel needs to be such that the used extractant remains in liquid form. Since the extraction is performed with an extractant in liquid form the temperature and pressures cannot be such that the extractant would be in supercritical state.

The extraction is performed in a conventional way. The yield aimed at is an efficient yield determined by the economics of the total process.

According to one embodiment, in batch operation the microbial biomass is led to a closed pressure reactor together with the extracting solvent. The vessel is optionally purged with inert gas and it is thereafter closed and heated into the desired temperature. The lipid recovery yield is enhanced by increasing the amount of extracting solvent. Preferably, the amount of biomass dry matter to the total amount of extractant is from 1:1 to 1:20 more preferably from 1:2 to 1:15 most preferably from 1:2.5 to 1:6. The extraction is performed under vigorous or efficient mixing to ensure uniform and effective contact between the solvent and biomass. The delay time is typically from tens of minutes to a few hours depending on the temperature, biomass type, solvent and batch size.

In one embodiment the amount of biomass dry matter when using dried biomass to the total amount of solvent is about 1:5.

The extraction may be performed in industrial scale in continuous mode either counter currently or co-currently by modifying the apparatus and process details by a skilled person in the art.

After extraction, the desired recovered lipids, fats and oils reside in the organic extractant phase. They may be separated from the organic solvent by conventional means such as distillation or evaporation or used as such for further processing.

In one embodiment the recovered lipids in the mixture with the extractant are used as such for oil catalytic biofuel refining processes.

In another embodiment the extractant is separated and recycled back to extraction process for reuse.

Typically, the yield is at least about 70% as percent of the total lipid content, preferably more than about 80%, or most preferably more than 85% or even more than 90%, depending on the selected processing parameters, biomass and desired purity values aimed at. For algae *Nannochloropsis* yields more than 90% are obtained whereas for *Chlorella* or *Dunaliella* the yield is slightly less from about 80 to 85%. The yields for bacteria, such as *Rhodococcus*, is generally high, about 80%, preferably above 90%, depending on the selected temperature.

In yet another embodiment of the present invention in addition to the primary non-polar organic extractant at least one secondary liquid extractant capable of penetrating cell walls of the microbial species contained in said biomass is added. In the extraction step two phases are formed, namely, an aqueous phase comprising the secondary extractant and an organic phase comprising the primary extractant. Water is preferred for forming the second phase in addition to the extracting solvent for accommodating the undesired residues such as metals, phosphorus compounds, sugars and the like. To some extent these residues may adhere to the biomass residue surface but mainly they will reside in the aqueous phase. Preferably the secondary extractant comprises a water soluble organic solvent. More preferably this organic solvent is water soluble alcohol, acid such as acetic acid or formic acid, or ketone such as acetone. Most preferably the organic solvent is an alcohol selected from methanol, ethanol, isopropanol and propanol. These two extractant components are essentially immiscible with each other after the extraction has taken place. The extractant may dissolve in each other prior to extraction. The extractants may form a two phase system before and/or after extraction, but at least after. The water and the low amount of alcohol present in the extraction suppress the undesired transesterification, preferably the amount of formed esters is below 3% by weight.

In a yet preferred embodiment of the two phase extraction, preferred secondary and primary extractant pairs are methanol and/or ethanol with heptane and/or octane, respectively. A further example for a suitable primary extractant is low aromatic or aromatic free HC solvent mixture such as NESSOL LIAV 110 and the like. The ratio of used extractants such as heptane and ethanol to the treated cell biomass should be within reasonable limits even though increasing the amount of extractant will increase the yield. The amount of biomass dry matter to the total amount of extractant is from 1:1 to 1:20 more preferably from 1:2 to 1:15 most preferably from 1:2.5 to 1:6. The ratio of the secondary extractant to the primary extractant is from 1:10 to 2:1. The higher amount of secondary extractant is especially useful for certain bacteria based biomasses and for inhibiting the formation of irreversible water emulsions.

A major advantage in the method of the present invention is that the high amount of phospholipids is essentially not present in the oil phase any more. The high temperature extraction clearly enhances the selectivity of lipids towards the oil phase whereas the phosphorus and metals remain in the aqueous phase.

The phosphorus content of the extracted and possibly separated lipid product in the method of the present invention is dramatically decreased compared to the content in lipids extracted at lower temperatures. Extracting below 170° C. produces lipid phosphorus content of more than 500 ppm or even 2000 ppm for such as heterotrophic species including certain algae and filamentous fungi, or even 2000-5000 ppm as for autotrophic algae and for example for *Rhodococcus*. In the method of the present invention the phosphorus content is decreased into less than 20 ppm, preferably into less than 15 ppm, or even into less than 10 ppm.

Using the method of the present invention the metal content of the extracted lipids or the mixture of lipids in the extractant is lowered into about one twentieth or even one hundredth part of the content in lipids extracted at low temperatures. The obtained lipid product of the present invention contains only a clearly decreased amount of metals or metal salts. Typical harmful impurities comprise Al, Cr, Cu, Fe, Mg, Ni, Pb, Zn and Mn which are detrimental for e.g. catalytic oil refining. According to the present invention, preferably the total metal content is decreased from several thousands of ppms into reasonable ranges such as a few hundred ppms for autotrophically cultured salt water algae, or less than 20 ppm, preferably less than 10 ppm, more preferably less than 5 ppm, for heterotrophically grown species depending on the temperature and solvent combination used.

In the high temperature and pressure extraction conditions of the present invention the emulsifier or detergent type compounds residing in microbial biomass either decompose or remain in the aqueous phase, and will thus not interfere with the subsequent oil refining processes.

In a further aspect of the present invention the recovered lipids produced by the above depicted methods are used in production of biodiesel, renewable diesel, jet fuel, gasoline or base oil components.

In a preferred embodiment the lipids recovered from the wet microbial biomass with the method according to the invention is used as feedstock for the production of biodiesel, renewable diesel, jet fuel, gasoline or base oil components and the like. By the term "biodiesel" is meant diesel which consists of fatty acid alkyl esters, and is typically produced by transesterification. In transesterification, the acylglycerols are converted to long-chain fatty acid alkyl esters, such as methyl, ethyl or propyl esters. By the term "renewable diesel" is meant fuel which is produced by hydrogen treatment of lipids, such as hydrogen deoxygenation, hydrogenation or hydroprocessing. In hydrogen treatment, acylglycerols are converted to corresponding alkanes i.e. paraffins. The paraffins can be further modified by isomerization or by other process alternatives. Renewable diesel process is optionally used to produce jet fuel and/or gasoline. In addition, cracking of lipids can be performed to produce biofuels. Furthermore, lipids are preferably used as biofuels directly without any further treatment in certain applications.

The invention is further illustrated by examples but not restricted thereto.

EXAMPLES

The pressure reactor used for the experiments was from Parr Instruments, model 4843. Heptane was n-heptane 99% pure (from J. T. Baker).

Gas Chromatograph (GC) used in analysis was a 6890N from Agilent Technologies, and Ion Coupled Plasma (ICP) analyser was an Optima 7300 DV from Perkin Elmer.

Example 1

Algae biomass used contained a large amount of metals and phosphorus due to autotrophic cultivation in salty sea water and it had a high phospholipid content of cells. The dry weight of the centrifuged biomass was 33% by weight and the dry matter contained 21% by weight of lipids.

The dry matter content of the original untreated biomass was determined by drying the biomass at 105° C. in oven, and the lipid content of the original untreated biomass was determined by GC after lipid saponification and methylation.

150 g of centrifuged cells of wet biomass, obtained from the cultivation of *Nannochloropsis* microalgae, and 150 g of heptane were weighed into a 1000 ml stirred pressure reactor. The closed vessel was heated to the preset extraction temperature, 160° C., 180° C., 200° C. and 225° C., and kept there during 60 minutes and then allowed to cool down into approximately 30° C. The cell-solvent mixture was continuously agitated inside the pressure reactor at 500 rpm speed during extraction. The reactor was opened and the heptane-oil phase was separated from the biomass and water phase by centrifugation (10 min, 4430 rpm) and settled in a separatory funnel. The heptane-oil phase was evaporated in a rotavapor. The oil was weighed. The total fatty acid content was analysed with GC after lipid saponification and methylation. Metal and phosphorus contents were determined by ICP-analysis.

The oil yield i.e. extracted total fatty acids compared to total lipids in biomass before extraction and the total metal content including Mg, Na, Ca, Cu, Zn, Al, Cr, Ni, Mn, V and Pb and the phosphorus content in oil as a function of the extraction temperature is shown in FIG. 1.

Table 1 shows the amount of each metal impurity, phosphorus impurity and oil yield in oils extracted at different temperatures.

Oil yield increased with increasing extraction temperature. A large decrease in phosphorus content can be seen when the extraction temperature is increased from 160° C. to 200° C. (2810 ppm and 225 ppm). The phosphorus content is the lowest, 7.3 ppm, in oil extracted at 225° C. The metal content decreased hand in hand with the phosphorus content, total metal content being the lowest, 135 ppm, in oil extracted at 225° C.

TABLE 1

|  | Oil extracted at 160° C. | Oil extracted at 180° C. | Oil extracted at 200° C. | Oil extracted at 225° C. |
| --- | --- | --- | --- | --- |
| P (ppm) | 2810 | 2220 | 225 | 7.3 |
| Mg (ppm) | 489 | 92.8 | 40 | 1.6 |
| Na (ppm) | 1990 | 2350 | 152 | 79.9 |
| Ca (ppm) | 189 | 8.2 | 14 | 2.4 |
| Cu (ppm) | 61 | 40 | 39 | 23.6 |
| Zn (ppm) | 65 | 54.8 | 51 | 23.9 |
| Pb (ppm) | 13.3 | <0.4 | <1 | <0.4 |
| Al (ppm) | 1.5 | 0.2 | <1 | 0.3 |
| Cr (ppm) | 0.6 | 0.2 | <1 | 0.2 |
| NI (ppm) | 2.5 | 1.2 | <1 | 2.8 |
| Mn (ppm) | 3.3 | 1.1 | <1 | 0.2 |
| V (ppm) | <0.1 | 0.6 | <1 | <0.1 |
| sum of metals (ppm) | 2815 | 2549 | 296 | 135 |
| oil yield (%) | 82.6 | 78.3 | 86.9 | 94.6 |

This example indicates that algal oil containing less than 10 ppm phosphorus is obtained with 95% oil yield using the method of the present invention. The quality of oil product improved remarkably i.e. the phosphorus and metal contents decrease when the extraction temperature of the wet biomass is increased to 200° C. or even more when increased to 225° C.

Example 2

Similarly to example 1, the algae biomass used contained a large amount of metals and phosphorus due to autotrophic cultivation in salty sea water and it had a high phospholipid content of cells. In this example, the dry weight of the centrifuged biomass was 19% and the dry matter contained 13% lipids. 300 g of centrifuged cells of wet biomass, obtained from the cultivation of *Nannochloropsis* microalgae, and 300 g of heptane was weighed into a 1000 ml stirred pressure reactor. The extraction was carried out in the same way as in example 1.

Figure 2:
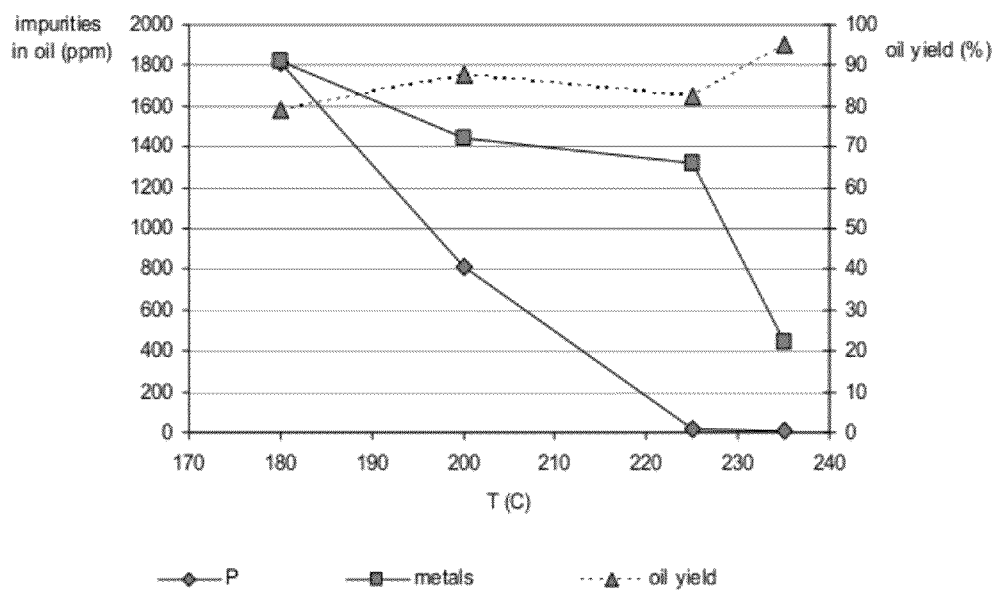
FIG. 2 shows the oil yield and the impurity levels as a function of extraction temperature for *Nannochloropsis* microalgae extracted with heptane according to example 2.

The oil yield i.e. extracted total fatty acids compared to total lipids in biomass before extraction, and the total metal (Mg, Na, Ca, Cu, Zn, Al, Cr, Ni, Mn, V, Pb) and phosphorus content in oil as a function of extraction temperature is shown in FIG. 2.

Table 2 shows the amount of each metal, phosphorus and oil yield in oils extracted at different temperatures.

TABLE 2

|  | Oil extracted at 180° C. | Oil extracted at 200° C. | Oil extracted at 225° C. | Oil extracted at 235° C. |
| --- | --- | --- | --- | --- |
| P (ppm) | 1810 | 808 | 13 | 5.6 |
| Mg (ppm) | 312 | 190 | 201 | 47.2 |
| Na (ppm) | 1220 | 808 | 671 | 196 |
| Ca (ppm) | 108 | 154 | 241 | 57.6 |
| Zn (ppm) | 165 | 234 | 152 | 64.4 |
| Cu (ppm) | 8.7 | 44.3 | 48.7 | 68.6 |
| Ni (ppm) | 1.8 | 2.1 | 2.5 | 2.6 |
| Sn (ppm) | 1.5 | 1.8 | 1.3 | 0.6 |
| Mn (ppm) | 0.3 | 0.5 | 0.9 | 0.6 |
| V (ppm) | 0.2 | 0.2 | 0.2 | 0.2 |
| Pb (ppm) | <0.4 | <0.4 | 0.4 | 0.7 |
| Cr (ppm) | 0.2 | <0.1 | 0.1 | <0.1 |
| sum of metals (ppm) | 1818 | 1435 | 1319 | 439 |
| lipid yield (%) | 79 | 87.7 | 82.3 | 95.0 |

The biomass with the lower lipid content and more water needed a higher extraction temperature compared to example 1 in order to get over 80% by weight of the lipids extracted. At 235° C. the oil yield was very high at 95% and the phosphorus content low at 5.6 ppm. The level of total metals was 439 ppm.

This example indicates that the quality of oil improved i.e. the phosphorus and the metal content decreases when the extraction temperature of the wet biomass is increased to above 200° C., or even better to above 235° C.

Example 3

300 g of wet centrifuged cells, obtained from the cultivation of *Rhodococcus*, a gram-positive bacterium, and 300 g of heptane was weighed into a 1000 ml stirred pressure reactor. The extraction was carried out in the same way as in example 1.

The bacterial biomass had in this experiment a dry matter content of 31% and the dry matter had a lipid content of 37% and contained some amount of salts.

Figure 3:
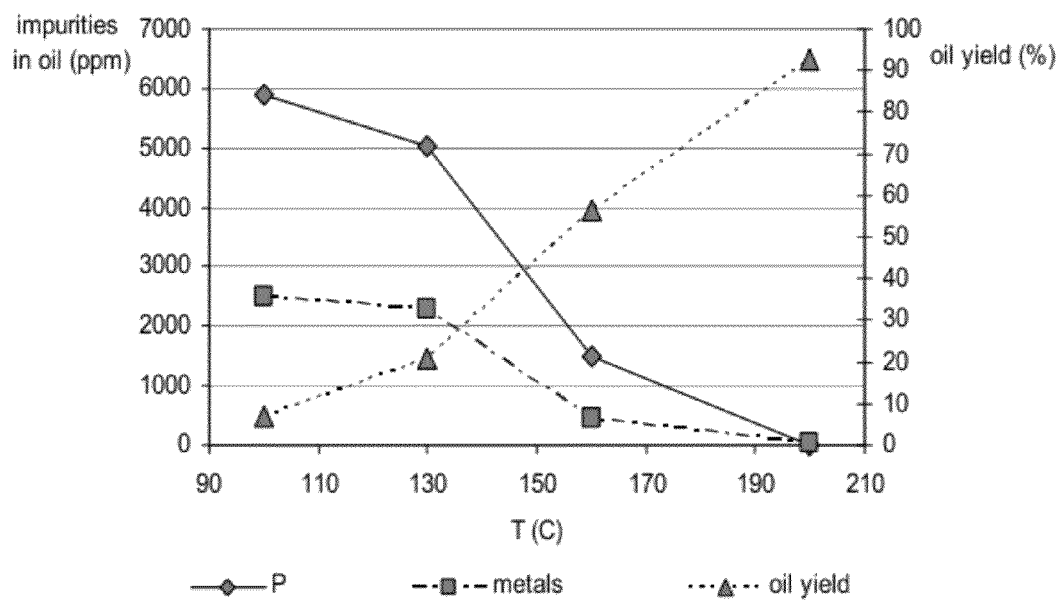
FIG. 3 shows the oil yield and the impurity levels as a function of extraction temperature for *Rhodococcus* bacteria extracted with heptane according to example 3.

The oil yield i.e. extracted total fatty acids compared to total lipids in biomass before extraction, and the total metal (Mg, Na, Ca, Cu, Zn, Al, Cr, Ni, Mn, V, Pb) content and phosphorus content in oil as a function of extraction temperature is shown in FIG. 3.

Table 3 shows the amount of metal and phosphorus content in extracted oil as well as the oil yield at different temperatures.

This example indicates that oil yield from bacterial biomass increases with increasing extraction temperature. The phosphorus and metal content decreases with increasing extraction temperature. At 200° C. 92.6% of total lipids is extracted with a phosphorus content of 12.7 ppm and the total amount of metals 32 ppm.

TABLE 3

|  | Oil extracted at 100° C. | Oil extracted at 130° C. | Oil extracted at 160° C. | Oil extracted at 200° C. |
|---|---|---|---|---|
| P (ppm) | 5900 | 5033 | 1500 | 12.7 |
| Mg (ppm) | 417 | 510 | 167 | 4.3 |
| Na (ppm) | 2000 | 1715 | 263 | 16.4 |
| Ca (ppm) | 56 | 53 | 26 | 10.6 |
| Zn (ppm) | 4.3 | 21 | 2.7 | 0.3 |
| Ni (ppm) | <1 | <1 | <0.1 | 0.1 |
| Mn (ppm) | <1 | <1 | 0.8 | 0.1 |
| V (ppm) | <1 | 4 | <0.1 | 0.1 |
| Cu (ppm) | 2 | <1 | 0.6 | 0.2 |
| Cr (ppm) | <1 | <1 | <0.1 | <0.1 |
| Al (ppm) | 1 | <1 | 0.2 | 0.1 |
| Pb (ppm) | <1 | <1 | <0.4 | <0.4 |
| sum of metals (ppm) | 2480 | 2303 | 460 | 32 |
| oil yield (%) | 6.9 | 21.0 | 56.5 | 92.6 |

Example 4

300 g of wet filtered cells, obtained from the heterotrophic cultivation of *Chlorella* microalgae, and 300 g of heptane was weighed into a 1000 ml stirred pressure reactor. The extraction was carried out in the same way as in example 1.

In this experiment the algal biomass had a dry matter content of 12% and the dry matter had a lipid content of 43% and contained some amount of salts.

Figure 4:
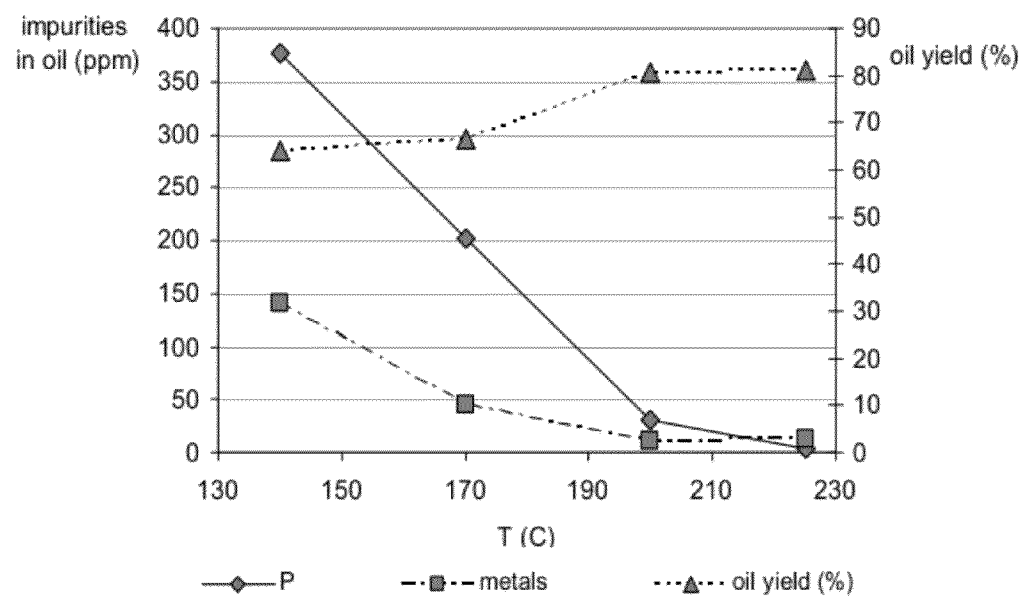
FIG. 4 shows the oil yield and the impurity levels as a function of extraction temperature for *Chlorella* microalgae extracted with heptane according to example 4.

The oil yield i.e. extracted total fatty acids compared to total lipids in biomass before extraction and the total metal (Mg, Na, Ca, Cu, Zn, Al, Cr, Ni, Mn, V, Pb) content and the phosphorus content in oil as a function of extraction temperature is shown in FIG. 4.

Table 4 shows the amount of each metal, phosphorus and oil yield in oils extracted at different temperatures.

TABLE 4

|  | Oil extracted at 140° C. | Oil extracted at 170° C. | Oil extracted at 200° C. | Oil extracted at 225° C. |
|---|---|---|---|---|
| P (ppm) | 377 | 202 | 30 | 3.5 |
| Al (ppm) | <1 | 0.1 | <1 | 0.4 |
| Cr (ppm) | <1 | 0.2 | 1 | <0.1 |
| Ni (ppm) | <1 | <0.1 | <1 | <0.1 |
| Mn (ppm) | <1 | <0.1 | <1 | <0.1 |
| V (ppm) | <1 | <0.1 | <1 | <0.1 |
| Cu (ppm) | 2 | 1.1 | <1 | 1.9 |
| Ca (ppm) | 50 | 8.6 | 2 | 0.8 |
| Mg (ppm) | 42 | 7.4 | <1 | 0.3 |
| Na (ppm) | 43 | 25.6 | 8 | 8.8 |
| Pb (ppm) | <1 | <0.4 | <1 | <0.4 |
| Zn (ppm) | 3.3 | 1.5 | <1 | 0.5 |
| sum of metals (ppm) | 140 | 45 | 11 | 13 |
| oil yield (%) | 63.9 | 66.4 | 80.7 | 81.0 |

At 200° C. algal oil was extracted with a yield of 81%, and the oil has only 30 ppm phosphorus and 11 ppm total metals. At 225° C. the oil yield is 81% and the phosphorus content is decreased to 3.5 ppm and metal content is 13 ppm.

This example indicates that the oil yield and oil quality from *Chlorella* microalgae improves when temperature in extraction is increased to 200° C.

Example 5

60 g of wet filtered cells, obtained from the heterotrophic cultivation of *Mortierella* filamentous fungi, and 260 g of heptane was weighed into a 1000 ml stirred pressure reactor. The extraction was carried out in the same way as in example 1.

Figure 5:
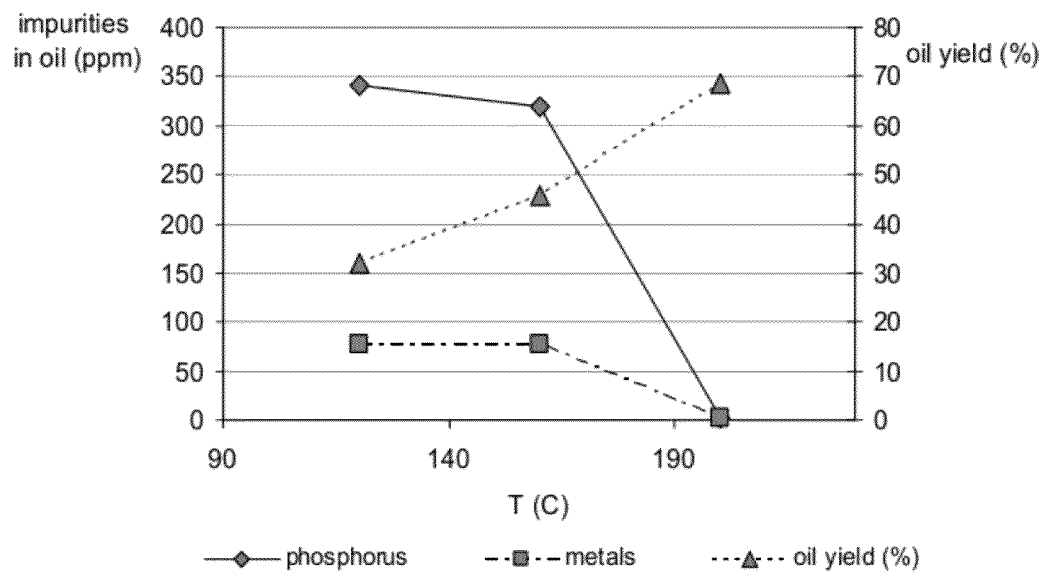
FIG. 5 shows the oil yield and the impurity levels as a function of extraction temperature for *Mortierella* fungi extracted with heptane according to example 5.

In this experiment the fungal biomass had a dry matter content of 38% and the dry matter had a lipid content of 58% and contained some amount of salts The oil yield i.e. extracted total fatty acids compared to total lipids in biomass before extraction, and the total metal (Mg, Na, Ca, Cu, Zn, Al, Cr, Ni, Mn, V, Pb) content and the phosphorus content in oil as a function of extraction temperature is shown in FIG. 5.

Table 5 shows the amount of each metal, phosphorus and oil yield in oils extracted at different temperatures.

TABLE 5

|  | Oil extracted at 120° C. | Oil extracted at 160° C. | Oil extracted at 200° C. |
|---|---|---|---|
| P (ppm) | 340 | 320 | 2 |
| Mg (ppm) | 18 | 17 | <1 |
| Na (ppm) | 30 | 49 | 1 |
| Ca (ppm) | 27 | 11 | <1 |
| Ni (ppm) | 0.1 | <1 | <1 |
| Mn (ppm) | 0.9 | <1 | <1 |
| V (ppm) | <0.1 | <1 | <1 |
| Cu (ppm) | 0.2 | <1 | <1 |
| Cr (ppm) | <0.1 | <1 | <1 |
| Al (ppm) | <0.1 | <1 | <1 |
| Pb (ppm) | <0.4 | <1 | <1 |
| Zn (ppm) | 0.3 | <1 | <1 |
| sum of metals (ppm) | 75 | 77 | <11 |
| lipid yield (%) | 31.8 | 45.6 | 68.7 |

This example indicated that the oil yield from filamentous fungal biomass was increased with increasing extraction temperature. The phosphorus and metal content decreased notably when the extraction temperature rose to 200° C. At 200° C. the oil extracted had 2 ppm phosphorus and less than 1 ppm of all measured metals.

Example 6

200 g of wet cells, obtained from the cultivation of *Lipomyces* yeast, and 200 g of heptane is weighed into a 1000 ml stirred pressure reactor. The extraction is carried out in the same way as in example 1.

The fungal biomass had a dry matter content of 11% and the dry matter has a lipid content of 40% and contains some amount of salts.

The oil yield i.e. extracted total fatty acids compared to total lipids in biomass before extraction, and the total metal (Mg, Na, Ca, Cu, Zn, Al, Cr, Ni, Mn, V, Pb) content and the phosphorus content in oil extracted at 150° C. and 200° C. is shown in Table 6.

TABLE 6

|  | Oil extracted at 150° C. | Oil extracted at 200° C. |
|---|---|---|
| P (ppm) | 0.7 | 6.5 |
| Ni (ppm) | <0.1 | 0.1 |
| Mn (ppm) | <0.1 | <0.1 |
| V (ppm) | <0.1 | <0.1 |
| Cu (ppm) | 0.2 | 0.2 |
| Ca (ppm) | 0.2 | 0.4 |
| Cr (ppm) | <0.1 | <0.1 |
| Mg (ppm) | <0.1 | 0.2 |
| Al (ppm) | 0.1 | <0.1 |
| Na (ppm) | <0.5 | 3.7 |
| Pb (ppm) | <0.4 | <0.4 |
| Zn (ppm) | 0.1 | <0.1 |
| Oil yield (%) | 37.8 | 85.9 |

Experiment at 100° C. showed the oil yield is very low, only 4.2% by weight. The oil yield is still quite low, about 38% by weight, in extraction at 150° C. At 200° C. the yield increases to about 86% by weight, indicating a need of a higher temperature for extracting lipids from solutions having this low dry matter content. The impurity level is very low in both extractions, at 150 and 200° C.

This example indicates that oil yield from yeast biomass increases considerably at high temperature. High purity oil from yeast biomass can already be obtained in extraction at 150° C., but the oil yield remains much lower than at 200° C.

Comparative Example 1

60 g of spray-dried cells, obtained from the cultivation of *Dunaliella* algae, and 300 g of heptane were weighed into a 1000 ml stirred pressure reactor. The vessel is then heated to the preset extraction temperature, 100° C., 160° C., 200° C., 225° C., and kept there for 60 minutes, and then allowed to cool into approximately 30° C. The cell-solvent mixture was continuously agitated in the pressure reactor at 500 rpm speed during extraction. The reactor was opened and the solvent was separated from the biomass by centrifugation (10 min, 4430 rpm). The solvent containing the oil was evaporated in a rotavapor. The oil was weighed. The total fatty acids are analysed with GC after lipid saponification and methylation. Metal and phosphorus content is determined by ICP-analysis.

The dried algae biomass contained a large amount of salts, as it is cultivated autotrophically in high salt sea water, as well as phosphorus because of a large level of phospholipids of the total lipids. The dry spray-dried algae biomass, dry weight about 98%, contained 10% lipids.

Figure 6:
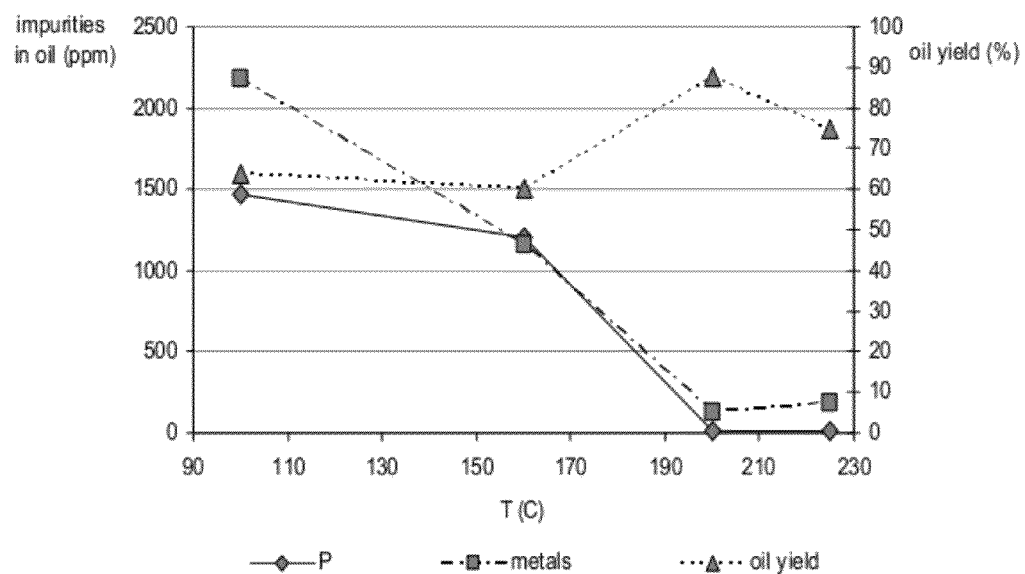
FIG. 6 shows the oil yield and the impurity levels as a function of extraction temperature for dry *Dunaliella* microalgae extracted with heptane according to comparative example 1.

The oil yield i.e. extracted total fatty acids compared to total lipids in biomass before extraction, and the total metal (Mg, Na, Ca, Cu, Al, Cr, Zn, Ni, Ba, Mn, V, Pb) content and the phosphorus content in oil as a function of extraction temperature is shown in FIG. 6.

Table 7 shows the amount of each metal, phosphorus and oil yield in oils extracted at different temperatures.

The oil yield is higher in the oil extracted at 200° C. compared to 100° C. and 160° C. (88% compared to 64 and 60%), however, the level of impurities (metals and phosphorus) decreased at the higher temperature. The level of phosphorus decreased from 1470 ppm at 100° C. to 15 ppm at 200° C. and 6.8 ppm at 225° C. The metal content decreased to 121 ppm at 200° C. compared to 2182 ppm at 100° C. and 1154 ppm at 160° C.

TABLE 7

|  | Oil extracted at 100° C. | Oil extracted at 160° C. | Oil extracted at 200° C. | Oil extracted at 225° C. |
|---|---|---|---|---|
| P (ppm) | 1470 | 1200 | 15 | 6.8 |
| Mg (ppm) | 1122 | 907 | 15 | 31.2 |
| Na (ppm) | 680 | 108 | 95 | 111 |
| Ca (ppm) | 355 | 120 | 6 | 28.4 |
| Al (ppm) | 13 | 12.5 | <1 | 0.7 |
| Cu (ppm) | 6 | 3.6 | 5 | 5.9 |
| Zn (ppm) | 3.7 | 0.6 | <1 | 1.6 |
| Cr (ppm) | 2 | 0.6 | <1 | <0.1 |
| Ni (ppm) | <1 | 0.3 | <1 | 0.8 |
| Mn (ppm) | <1 | 1 | <1 | 0.1 |
| V (ppm) | <1 | <0.1 | <1 | <0.1 |
| Pb (ppm) | <1 | 0.7 | <1 | 2.7 |
| sum of metals (ppm) | 2182 | 1154 | 121 | 182 |
| oil yield (%) | 63.7 | 60.0 | 87.6 | 75.0 |

This example indicates that comparable results are obtained when using wet algae biomass compared to using biomass which is specifically pretreated i.e. dried before extraction.

Comparative Example 2

60 g of dry lyophilized cells, obtained from the cultivation of *Rhodococcus* bacteria, and 300 g of heptane is weighed into a 1000 ml stirred pressure reactor. The extraction is carried out in the same way as in example 1.

The lyophilized biomass has a lipid content of 43% and contains some amount of salts originating from the culture broth as well as phosphorus from membrane lipids.

Figure 7:
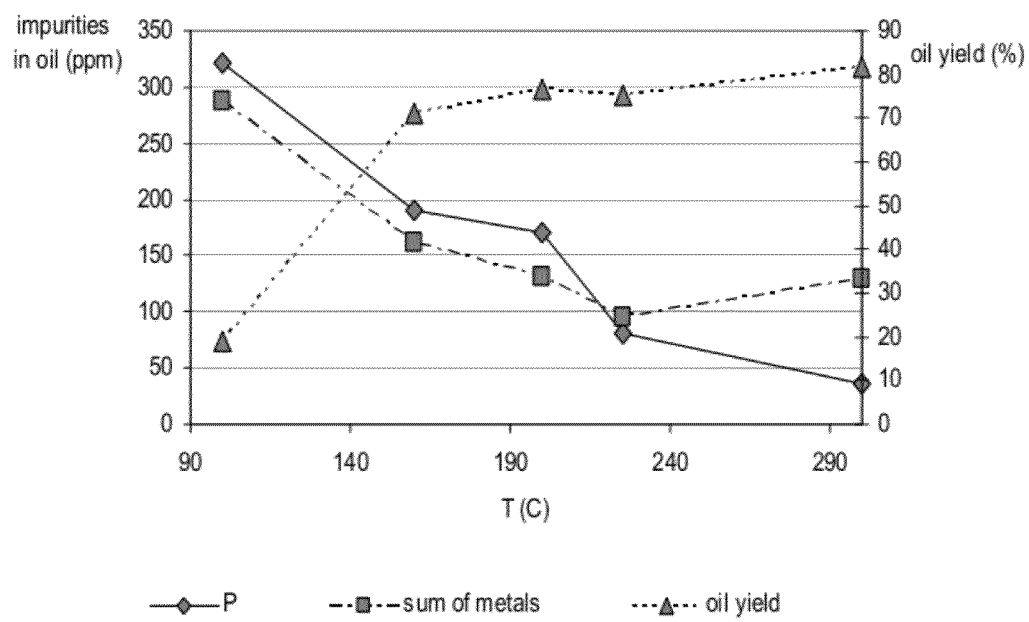
FIG. 7 shows the oil yield and the impurity levels as a function of extraction temperature for dry *Rhodococcus* bacteria extracted with heptane according to comparative example 2.

The oil yield (extracted total fatty acids compared to total lipids in biomass before extraction), and metal (Mg, Na, Ca, Cu, Al, Cr, Ni, Mn, V, Pb) and phosphorus content in oil as a function of extraction temperature is shown in FIG. 7.

Table 8 shows the amount of each metal, phosphorus and oil yield in oils extracted at different temperatures.

TABLE 8

|  | Oil extracted at 100° C. | Oil extracted at 160° C. | Oil extracted at 200° C. | Oil extracted at 225° C. | Oil extracted at 300° C. |
|---|---|---|---|---|---|
| P (ppm) | 321 | 191 | 170 | 80.7 | 36.1 |
| Mg (ppm) | 35.6 | 27.4 | 4.3 | 1.7 | 5.5 |
| Na (ppm) | 240 | 120 | 117 | 89.2 | 88.9 |
| Ca (ppm) | 6.7 | 6 | 3.1 | 0.7 | 4.3 |

TABLE 8-continued

|  | Oil extracted at 100° C. | Oil extracted at 160° C. | Oil extracted at 200° C. | Oil extracted at 225° C. | Oil extracted at 300° C. |
|---|---|---|---|---|---|
| Cu (ppm) | 0.3 | 0.1 | 1 | 0.3 | 0.3 |
| Al (ppm) | 0.1 | <0.1 | <0.1 | 0.1 | <0.1 |
| Cr (ppm) | <0.1 | 0.1 | 0.1 | <0.1 | 0.3 |
| Ni (ppm) | 0.1 | 0.2 | 0.3 | 0.1 | 0.2 |
| Mn (ppm) | 0.1 | <0.1 | 0.1 | 0.1 | 0.2 |
| V (ppm) | <0.1 | 0.1 | <0.1 | 0.1 | 0.1 |
| Pb (ppm) | <0.4 | <0.4 | 0.7 | <0.4 | <0.4 |
| sum of metals (ppm) | 283 | 154 | 127 | 92 | 100 |
| oil yield (%) | 19.0 | 71.0 | 76.4 | 75.4 | 81.8 |

This example indicates that the oil yield increased with increasing temperature as the phosphorus and metal content decreased.

Example 7

Further experiments (examples 7-9) were made using pilot plant scale equipment.

Pressure reactor used in example 7 is build by DeDietrich, volume is 540 liters and maximum running pressure is 16 bar (a) and maximum temperature is 250° C.

Pressure reactor used in examples 8 and 9 is build by a Finnish company Japrotek, volume is 500 liters and maximum running pressure is 80 bar (a) and maximum temperature is 250° C.

152 kg of wet filtered cells, obtained from the cultivation of *Mortierella* fungi, is extracted in a 540 l stirred pressure reactor with 235 kg of NESSOL LIAV 230 (alkanes with boiling point area 175-230° C., from Neste Oil). The extraction is carried out at 190° C. for 3 hours maximum pressure 12.5 bar (a). The biomass is separated by filtration and the solvent phase washed with water. The heptane-oil phase is evaporated and oil analysed as in Example 1.

The fungal biomass has a dry matter content of 38% and the dry matter has a lipid content of 58% and contains some amount of salts originating from the culture broth as well as phosphorus from membrane lipids.

The oil yield and level of impurities (phosphorus and metals) in the extracted oil is shown in Table 9.

TABLE 9

|  | Oil extracted at 190° C. |
|---|---|
| Oil yield (%) | 80 |
| P (ppm) | 5.6 |
| Mg (ppm) | 0.3 |
| Na (ppm) | 3.1 |
| Ca (ppm) | 0.2 |
| Mn (ppm) | <0.2 |
| Al (ppm) | 0.1 |
| Cr (ppm) | <0.1 |
| Co (ppm) | 0.2 |
| Ni (ppm) | <0.3 |
| Pb (ppm) | <0.4 |
| V (ppm) | <0.3 |
| Zn (ppm) | 0.1 |

The oil yield is high at 80% and the oil extracted according to the invention is very low in impurities. The phosphorus level is 5.6 ppm and all measured metals are far below 1 ppm, only sodium is 3.1 ppm.

Example 8

150 kg of wet filtered cells, obtained from the cultivation of *Rhodococcus* bacteria, is extracted in a 500 l stirred pressure reactor with 125 kg of heptane and 32 kg of ethanol. The extraction is carried out at 200° C. for 3 hours, maximum pressure was 48 bar (a). The biomass is separated by filtration and the solvent phase washed with water. The heptane-oil phase is evaporated and oil analysed as in Example 1.

The bacterial biomass has a dry matter content of 25% and the dry matter has a lipid content of 30% and contains some amount of salts originating from the culture broth as well as phosphorus from membrane lipids.

The oil yield and level of impurities (phosphorus and metals) in the extracted oil is shown in Table 10.

TABLE 10

|  | Oil extracted at 200 C. |
|---|---|
| oil yield (%) | 75 |
| P (ppm) | 6.7 |
| Mg (ppm) | 10.8 |
| Na (ppm) | 5.8 |
| Ca (ppm) | 13.4 |
| Co (ppm) | 2.6 |
| Mo (ppm) | <1 |
| Mn (ppm) | 0.2 |
| Ni (ppm) | 0.2 |
| Pb (ppm) | <0.4 |
| V (ppm) | 0.1 |
| Zn (ppm) | 1.2 |
| Cr (ppm) | 0.1 |
| Al (ppm) | <0.1 |

The oil yield is high at 75% and the oil extracted according to the invention is very low in impurities. The phosphorus level is 6.7 ppm and all measured total metals are less than 30 ppm.

Example 9

150 kg of wet filtered cells, obtained from the cultivation of *Mortierella* fungi, is extracted in a 500 l stirred pressure reactor with 145 kg of NESSOL LIAV 110 (alkanes with boiling point area of 85-110° C., Neste Oil) and 64 kg absolute ethanol. The extraction is carried out at 190° C. for 0.5 hours, at maximum pressure of 32 bar (a). The biomass is separated by filtration, and the solvent phase is washed with water. The NESSOL LIAV 110 oil phase is evaporated and the obtained oil product is analysed as in Example 1.

The fungal biomass had a dry matter content of 38% of which 58% was lipids. Biomass also contained salts and phosphorus.

The oil yield and levels of phosphorus and metal impurities in the extracted oil are shown in Table 11.

TABLE 11

|  | Oil extracted at 190° C. |
|---|---|
| Oil yield (%) | 75 |
| P (ppm) | 1.2 |
| Mg (ppm) | 0.8 |
| Na (ppm) | 1.0 |
| Ca (ppm) | 0.8 |
| Mn (ppm) | <0.1 |
| Al (ppm) | 1.1 |
| Cr (ppm) | <0.1 |
| Ni (ppm) | <0.3 |
| Pb (ppm) | <0.4 |
| V (ppm) | <0.1 |
| Zn (ppm) | 0.6 |

The invention claimed is:

1. A method for recovering lipids from microbial biomass, comprising:
   (i) providing wet microbial biomass which contains lipids to extraction without disrupting the biomass cell walls,
   (ii) extracting said wet microbial biomass with a liquid extractant at elevated temperature of at least 170° C. and elevated pressure wherein the combination of the temperature and pressure is such that said lipids in said cells are contacted with said extractant, and
   (iii) subsequently recovering extracted lipids from or with said extractant.

2. The method according to claim 1, wherein the dry matter content of the wet biomass is less than 45% by weight, but at least 5%.

3. The method according to claim 1, wherein said wet microbial biomass is selected from the group consisting of bacteria, cyanobacteria, fungi, filamentous fungi and moulds, archaea, protists, and microscopic plants.

4. The method according to claim 1, wherein said temperature is from 170° C. to 300° C.

5. The method according to claim 1, wherein said extractant comprises non-polar organic solvent.

6. The method according to claim 1, wherein said extractant further comprises polar water miscible solvent.

7. The method according to claim 1, wherein the ratio of the dry matter of said microbial biomass to total amount of extractant is from 1:1 to 1:20.

8. The method according to claim 1, wherein additional water is added to biomass before, during or after extraction.

9. A method of catalytic refining for biofuel production, comprising recovering lipids from microbial biomass using the method according to claim 1.

10. A method of production of renewable diesel, comprising recovering lipids from microbial biomass using the method according to claim 1.

11. The method according to claim 1, wherein the dry matter content of the wet biomass is less than 40%, but at least 10%.

12. The method according to claim 1, wherein the dry matter content of the wet biomass is less than 40%, but at least 11%.

13. The method according to claim 1, wherein the dry matter content of the wet biomass is from 19% to 38%.

14. The method according to claim 1, wherein said wet microbial biomass is selected from the group consisting of bacteria, algae, microalgae, plankton, planarian, bacteria, fungi, filamentous fungi, moulds and yeasts.

15. The method according to claim 1, wherein said temperature is from 175° C. to 270° C.

16. The method according to claim 1, wherein said temperature is from 185° to 260° C.

17. The method according to claim 1, wherein said temperature is from 190° to 250° C.

18. The method according to claim 1, wherein said extractant comprises aliphatic or cyclic $C_3$-$C_{16}$ alkane.

19. The method according to claim 1, wherein said extractant comprises hexane, heptane, octane or mixtures thereof.

20. The method according to claim 1, wherein said extractant further comprises an alcohol or an organic acid.

21. The method according to claim 1, wherein the ratio of the dry matter of said microbial biomass to total amount of extractant is from 1:2 to 1:15.

22. The method according to claim 1, wherein the ratio of the dry matter of said microbial biomass to total amount of extractant is from 1:2.5 to 1:6.

* * * * *